(12) United States Patent
Yu et al.

(10) Patent No.: US 12,347,110 B2
(45) Date of Patent: Jul. 1, 2025

(54) SYSTEM AND METHOD FOR SYNTHETIC DATA GENERATION USING DEAD LEAVES IMAGES

(71) Applicant: Samsung Electronics Co., Ltd., Suwon-si (KR)

(72) Inventors: Mingzhao Yu, State College, PA (US); Zeeshan Nadir, Allen, TX (US); Hamid R. Sheikh, Allen, TX (US); John W. Glotzbach, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 18/060,419

(22) Filed: Nov. 30, 2022

(65) Prior Publication Data

US 2024/0087190 A1 Mar. 14, 2024

Related U.S. Application Data

(60) Provisional application No. 63/405,220, filed on Sep. 9, 2022.

(51) Int. Cl.

| | |
|---|---|
| *G06T 7/11* | (2017.01) |
| *G06T 5/40* | (2006.01) |
| *G06T 5/70* | (2024.01) |
| *G06T 7/90* | (2017.01) |
| *G06T 11/20* | (2006.01) |

(Continued)

(52) U.S. Cl.
CPC .............. *G06T 7/11* (2017.01); *G06T 5/40* (2013.01); *G06T 5/70* (2024.01); *G06T 7/90* (2017.01); *G06T 11/203* (2013.01); *G06T 11/40* (2013.01); *H04N 23/741* (2023.01); *G06T 2207/10024* (2013.01)

(58) Field of Classification Search
CPC ..... G06T 7/11; G06T 7/90; G06T 5/70; G06T 5/40; G06T 11/203; G06T 11/40; G06T 2207/10024

See application file for complete search history.

(56) References Cited

U.S. PATENT DOCUMENTS

| | | |
|---|---|---|
| 11,120,536 B2 | 9/2021 | Park et al. |
| 11,334,762 B1 | 5/2022 | Wrenninge |
| 2017/0178297 A1 | 6/2017 | Fattal |

(Continued)

OTHER PUBLICATIONS

Gousseau, Yann et al, "The dead leaves model: general results and limits at small scales", https://arxiv.org/pdf/math/0312035, Nov. 3, 2018. (Year: 2018).*

(Continued)

*Primary Examiner* — Michelle L Sams

(57) ABSTRACT

A method includes obtaining a raw image in a first image domain. The method also includes determining a color distribution and an amount of variation in the raw image. The method further includes using an iterative process to generate a dead leaf image from a blank image in the first image domain. The iterative process includes adding multiple circles and multiple sticks to the blank image until the dead leaf image is filled. The iterative process also includes blurring portions of the dead leaf image during at least one iteration of the iterative process. Textures of the multiple circles are blended based on the color distribution and the amount of variation in the raw image.

20 Claims, 10 Drawing Sheets

(51) Int. Cl.
    *G06T 11/40*     (2006.01)
    *H04N 23/741*     (2023.01)

(56) References Cited

U.S. PATENT DOCUMENTS

| | | |
|---|---|---|
| 2022/0215266 A1 | 7/2022 | Venkataraman et al. |
| 2022/0262103 A1 | 8/2022 | Gladisch et al. |
| 2023/0091909 A1* | 3/2023 | Chennagiri ............... G06T 7/90 |
| | | 345/582 |

OTHER PUBLICATIONS

Madhusudana, Pavan, et al., "Revisiting Dead Leaves Model: Training With Synthetic Data", IEEE Signal Processing Letters, vol. 29, 2022, Dec. 2, 2021. (Year: 2021).*

Cao, Frederic, et al., "Dead leaves model for measuring texture quality of a digital camera", Nov. 2017, https://corp.dxomark.com/wp-content/uploads/2017/11/Dead_Leaves_Model_EI2010.pdf (Year: 2017).*

Bordenave, Charles et al., "The dead leaves model: a general tessellation modeling occulsion", Appled Probability Trust, Jan. 19, 2006, https://perso.telecom-paristech.fr/gousseau/bgr.pdg (Year: 2006).*

Madhusudana et al., "Revisiting Dead Leaves Model: Training With Synthetic Data", Journals & Magazines, IEEE Signal Processing Letters, vol. 29, Dec. 2021, 5 pages.

* cited by examiner

SYSTEM AND METHOD FOR SYNTHETIC DATA GENERATION USING DEAD LEAVES IMAGES

CROSS-REFERENCE TO RELATED APPLICATION AND PRIORITY CLAIM

This application claims priority under 35 U.S.C. § 119(e) to U.S. Provisional Patent Application No. 63/405,220 filed on Sep. 9, 2022, which is hereby incorporated by reference in its entirety.

TECHNICAL FIELD

This disclosure relates generally to imaging systems. More specifically, this disclosure relates to a system and method for synthetic data generation using dead leaves images.

BACKGROUND

Recently, artificial intelligence (AI) technology has been applied to many camera applications (such as denoising, motion deblur, high dynamic range (HDR), segmentation, disparity estimate, optical flow estimate, multi-camera aligned capture, and the like) in order to advance the features of non-AI based image pipelines. However, creating realistic training data for some AI applications can be challenging because ground-truth data may not be available or easy to generate.

SUMMARY

This disclosure provides a system and method for synthetic data generation using dead leaves images.

In a first embodiment, a method includes obtaining a raw image in a first image domain. The method also includes determining a color distribution and an amount of variation in the raw image. The method further includes using an iterative process to generate a dead leaf image from a blank image in the first image domain. The iterative process includes adding multiple circles and multiple sticks to the blank image until the dead leaf image is filled. The iterative process also includes blurring portions of the dead leaf image during at least one iteration of the iterative process. Textures of the multiple circles are blended based on the color distribution and the amount of variation in the raw image.

In a second embodiment, an electronic device includes at least one processing device configured to obtain a raw image in a first image domain. The at least one processing device is also configured to determine a color distribution and an amount of variation in the raw image. The at least one processing device is further configured to use an iterative process to generate a dead leaf image from a blank image in the first image domain. In the iterative process, the at least one processing device is configured to add multiple circles and multiple sticks to the blank image until the dead leaf image is filled. In the iterative process, the at least one processing device is also configured to blur portions of the dead leaf image during at least one iteration of the iterative process. The at least one processing device is configured to blend textures of the multiple circles based on the color distribution and the amount of variation in the raw image.

In a third embodiment, a non-transitory machine-readable medium contains instructions that when executed cause at least one processor of an electronic device to obtain a raw image in a first image domain. The medium also contains instructions that when executed cause the at least one processor to determine a color distribution and an amount of variation in the raw image. The medium further contains instructions that when executed cause the at least one processor to use an iterative process to generate a dead leaf image from a blank image in the first image domain. During the iterative process, the instructions when executed cause the at least one processor to add multiple circles and multiple sticks to the blank image until the dead leaf image is filled. During the iterative process, the instructions when executed also cause the at least one processor to blur portions of the dead leaf image during at least one iteration of the iterative process. The instructions when executed cause the at least one processor to blend textures of the multiple circles based on the color distribution and the amount of variation in the raw image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
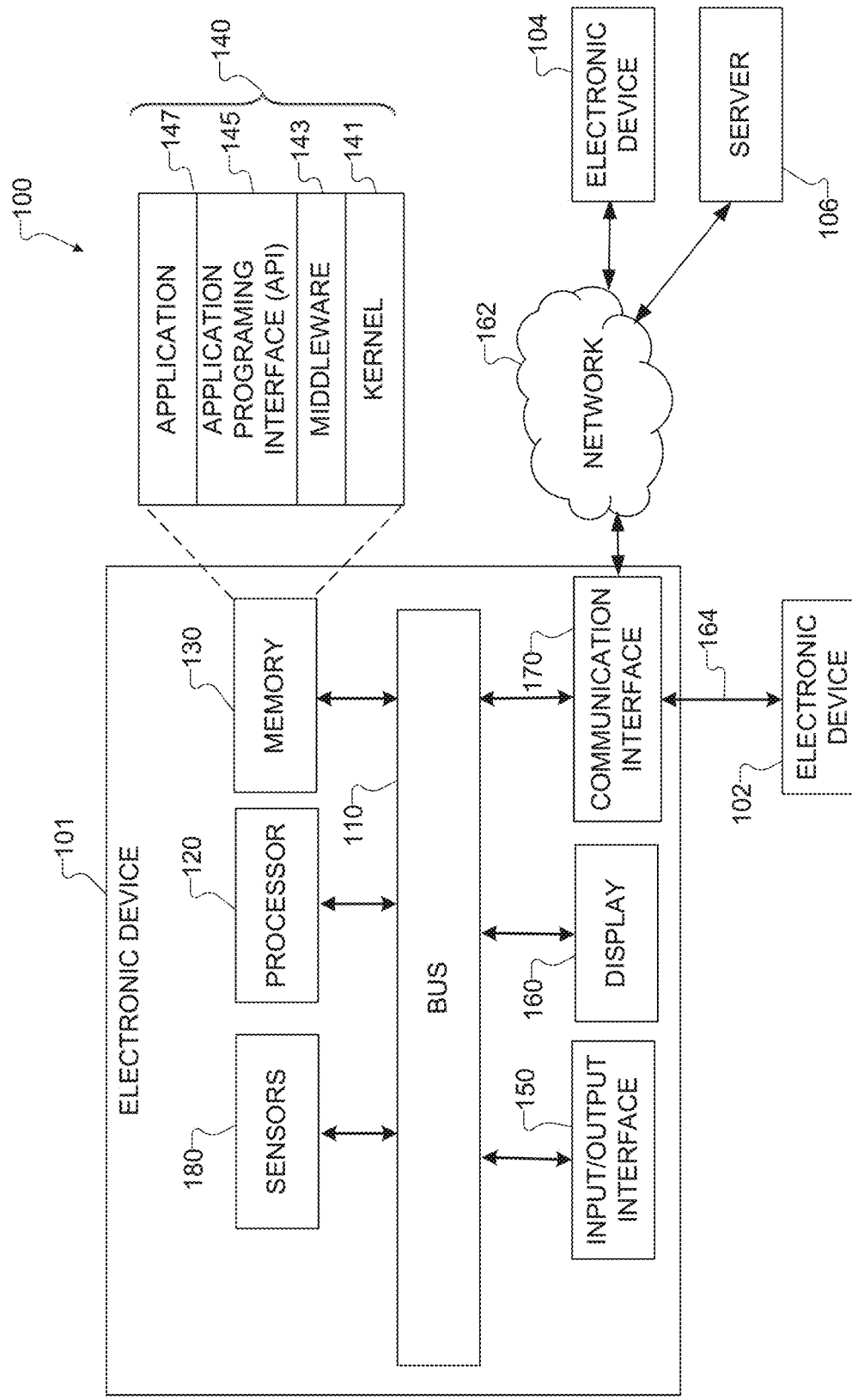
FIG. 1 illustrates an example network configuration including an electronic device according to this disclosure.

FIGS. 1 through 10, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, artificial intelligence (AI) technology has been applied to many camera applications (such as denoising, motion deblur, high dynamic range (HDR), segmentation, disparity estimate, optical flow estimate, multi-camera aligned capture, and the like) in order to advance the features of non-AI based image pipelines. However, creating realistic training data for some AI applications can be challenging because ground-truth data may not be available or easy to generate. Because of such challenges, training data generation for AI camera applications is an important task for improving AI camera performance. Typical techniques for collection and generation of training data for AI image processing tasks can be grouped into three categories, namely fully manual, semi manual, and fully synthetic. Each of these will now be described in the context of a raw image denoising technique.

In the fully manual approach, real image pairs (including both noisy and clean images) are collected. The ground truth images are typically low noise images with long exposure times. The input images are typically high noise images with short exposure times. Even if images can be manually captured (such as using one or more smart phone devices), the fully manual approach has a number of challenges and drawbacks, including (i) a large amount of human resource and cost, (ii) a need for manually-captured data sets to be reviewed by data engineers (which often leads to discarded data because of low quality capture or wrong capture), and (iii) a need to recapture and review training data if sensor hardware or a sensor configuration is changed.

In the semi manual approach, real clean images are collected. The ground truth images are typically low noise images with long exposure times. The input images are typically noisy and are generated from the ground truth and a synthetic noise model. The semi manual approach usually requires less labor and time than the fully manual approach. However, there is still a need to review and recapture data if sensor hardware or a sensor configuration is changed.

In the fully synthetic approach, ground truth images are synthesized. That is, the ground truth images are synthetic images. The input images are typically noisy and are generated from the synthetic ground truth images and a synthetic noise model. The fully synthetic approach requires very little (if any) manual labor and is much less time intensive than the fully manual and semi manual approaches. Also, there is very little need for recapturing for tuning or configuration changes. In addition, it is possible to generate millions of samples in a very short period of time. However, for quality results, the fully synthetic approach requires an accurate model of the image data and the sensor noise.

Recently, dead leaves models have been developed to generate synthetic data in the form of dead leaves images. Such images are referred to as dead leaves images due to their similarity to an image of layers of dead leaves that have fallen on the ground. While existing dead leaves models can generate synthetic images with similar power spectra as natural images, these models have some limitations. For example, in some existing dead leaves models, only circular discs are modeled, and color is only sampled in the standard red-green-blue (sRGB) space. Texture is blended in the sRGB space without modelling the scale of texture as well as the correlation between different color channels. Also, equal weights are given for texture and background color, which limits the flexibility of the model.

This disclosure provides systems and methods for synthetic data generation using dead leaves images. As described in more detail below, the dead leaves images are generated using synthetic models that improve upon existing dead leaves models. The disclosed systems and methods enable effective training of AI models even in scenarios where no data is readily available. Compared to prior techniques, the disclosed embodiments can improve the realism of generated images with almost no manual labor, less required time, and very little need for recapturing for tuning. This makes these embodiments ideal for real-world applications such as image denoising, image super-resolution, image reconstruction for under-display-cameras, or other applications. Note that while some of the embodiments discussed below are described in the context of use in consumer electronic devices (such as smart phones), this is merely one example, and it will be understood that the principles of this disclosure may be implemented in any number of other suitable contexts.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for synthetic data generation using dead leaves images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for synthetic data generation using dead leaves images as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for synthetic data generation using dead leaves images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
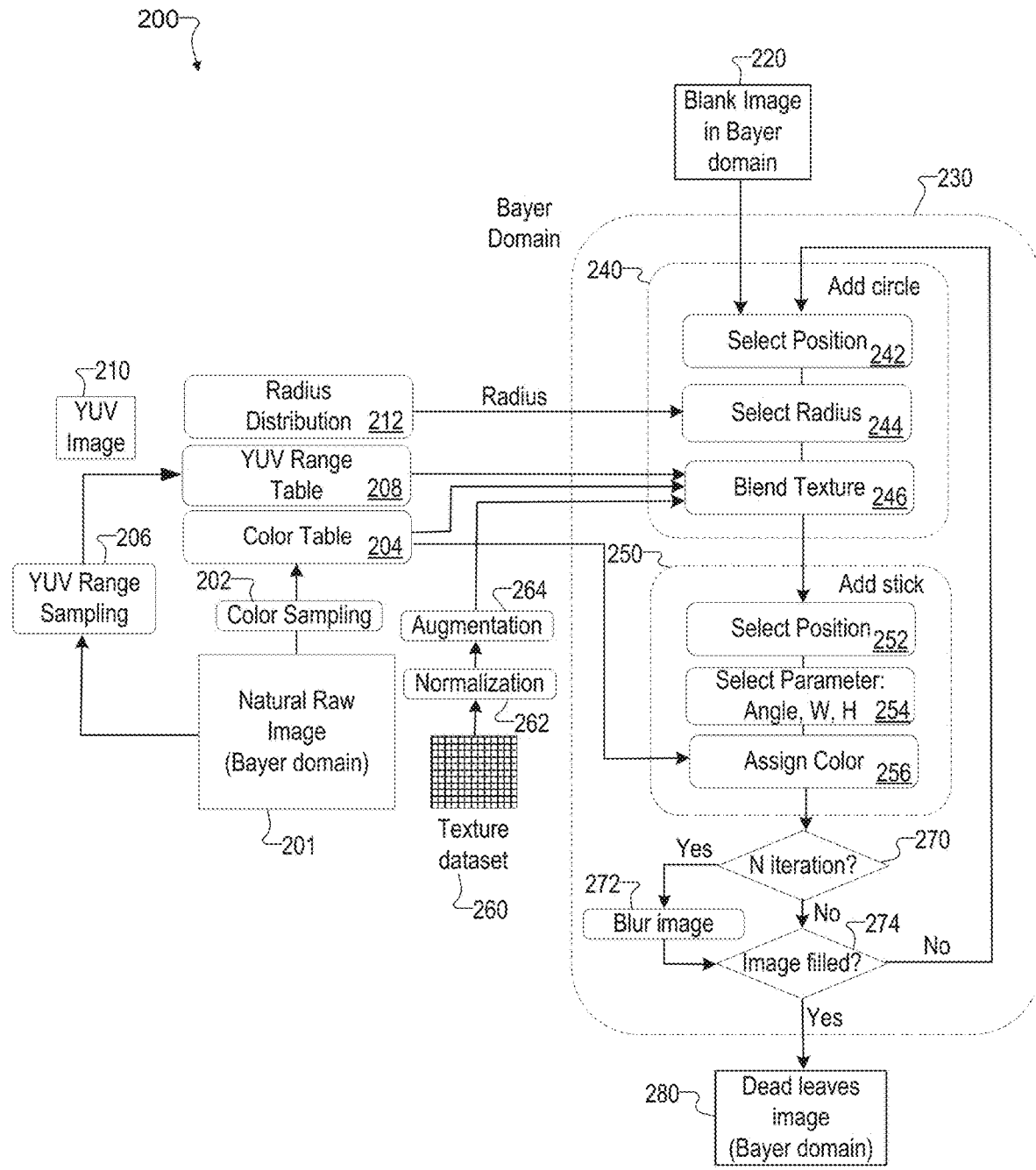
FIG. 2 illustrates an example process for generating synthetic dead leaves images according to this disclosure.

FIG. 2 illustrates an example process 200 for generating synthetic dead leaves images according to this disclosure. For ease of explanation, the process 200 is described as being implemented using one or more components of the server 106 described above. However, this is merely one example, and the process 200 could be implemented using any other suitable device(s).

As shown in FIG. 2, the server 106 obtains a natural raw image 201 in the Bayer domain. The raw image 201 may be selected from an image database, captured using a connected camera, downloaded from an online or web-based source, or obtained in any other suitable manner from any other suitable source. In some embodiments, the raw image 201 has a low ISO level. As described below, the raw image 201 will be used by the server 106 as a reference image to sample color and obtain local range variation. The raw image 201 is in the Bayer domain because sampling in the Bayer domain can accurately capture the image sensor's response and the color distribution in the image, as compared to sampling in the RGB domain and subsequently converting back to the Bayer domain.

After obtaining the raw image 201, the server 106 performs a color sampling operation 202 on the raw image 201 in order to generate a color table 204. The color table 204 represents the distribution of all colors that exist in the raw image 201. In the color sampling operation 202, the server 106 filters out the low noise in the raw image 201 in order to not model the noise in the color distribution. Any suitable noise filtering technique can be used to filter out the low noise. After filtering, the server 106 obtains color information for each pixel in the noise-filtered raw image 201. In some embodiments, rather than obtaining color information for the entire raw image 201, the server 106 may select one or more small portions of the raw image 201 and determine the color information in each small portion.

Using the color information, the server 106 creates a four-dimensional histogram of the color frequency information in the raw image 201, where the four dimensions represent the R, G, G, and B color elements of the Bayer domain (such as for red: (R, G, G, B)=(4095, 0, 0, 0)). From the color bins of the histogram, the server 106 generates the color table 204. For example, for each color bin of the histogram, the server 106 may add the four-element Bayer color number represented by that bin to the color table 204 N times, where N is the number of pixels collected in that bin. As a result, colors that appear more frequently in the raw image 201 have more entries or records in the color table 204, and colors that appear less frequently in the raw image 201 have fewer entries or records in the color table 204.

In addition to the color sampling operation 202, the server 106 also performs a YUV range sampling operation 206 on the raw image 201 in order to generate a YUV range table 208. The YUV range table 208 represents an estimate of how much variation is present in the raw image 201. For example, an image of a blue sky on a clear day would include little variation since the image would be mostly blue. However, an image of a park setting might include trees, sky, animals, ground, and other features and thus would include much more variation. In the YUV range sampling operation 206, the server 106 converts the raw image 201 from the Bayer domain to a luma-chroma (YUV) domain, thus creating a YUV image 210. The server 106 crops the YUV image 210 into multiple patches of a specified size (such as 50×50 pixels or any other suitable size). Any suitable techniques for conversion to the YUV domain and cropping of an image (including those currently known and those that may be developed in the future) can be used in the YUV range sampling operation 206.

Once the patches are generated, the server 106 computes the range of each channel (such as the Y, U, and V channels) for each patch, where the range is defined as the difference between the highest value to the lowest value for that channel in that patch. Using the range information for each patch, the server 106 can create a three-dimensional histogram of patch range, where the three dimensions represent the ranges of each of the Y, U, and V channels of the YUV domain. From the histogram, the server 106 generates the YUV range table 208. Similar to the generation of the color table 204, for each bin of the histogram, the server 106 may add the three-element ranges of Y, U, and V number represented by that bin to the YUV range table 208 N times, where N is the number of range values collected in that bin. As a result, range values that appear more frequently in the YUV image 210 will have more entries or records in the YUV range table 208, and the range values that appear less frequently in the YUV image 210 will have fewer entries or records in the YUV range table 208.

In addition to generating the color table 204 and the YUV range table 208, the server 106 uses an overall radius distribution 212 (e.g., $f(r)=Kr^{-3}$ where K is a normalizing constant) for the circles that will be added to each dead leaves image. The radius distribution 212 has been shown to produce images with power distribution matching closely to those of real images (see, e.g., Ann B. Lee, David Mumford, and Jinggang Huang, "A statistical study of scale invariant dead leaves model"). Other radius distributions 212 can be used, such as those informed by the raw image 201.

Once the server 106 has obtained the color table 204, the YUV range table 208, and the radius distribution 212, the server 106 can perform operations to generate each dead leaves image. For example, the server 106 may obtain a blank image 220 in the Bayer domain. The blank image 220 can be initially blank in that it contains no image data, and each pixel is initialized to the same value. Using the blank image 220 as an input, the server 106 performs an iterative process 230 that adds geometric shapes, such as circles 240 and sticks 250, to the blank image 220. During each iteration, the server 106 can add one or more circles 240 and one or more sticks 250 to the blank image 220. The number of circles 240 and sticks 250 added during each iteration can be the same or different. The output of the iterative process 230 is a dead leaves image 280 in the Bayer domain.

To add a circle 240 to the blank image 220, the server 106 selects a position 242 in the blank image 220 for the circle 240 to be added and selects a radius 244 for the circle 240. The radius 244 is determined by drawing a sample radius from the radius distribution 212. The server 106 also performs a texture blending operation 246 in which texture and color information are added to the circle 240. As shown in FIG. 2, in the texture blending operation 246, the server 106 uses color information from the color table 204, range information from the YUV range table 208, and texture map information from a texture dataset 260. The texture map information provides a basis for the overall appearance for the texture in the circle 240.

Figure 3:
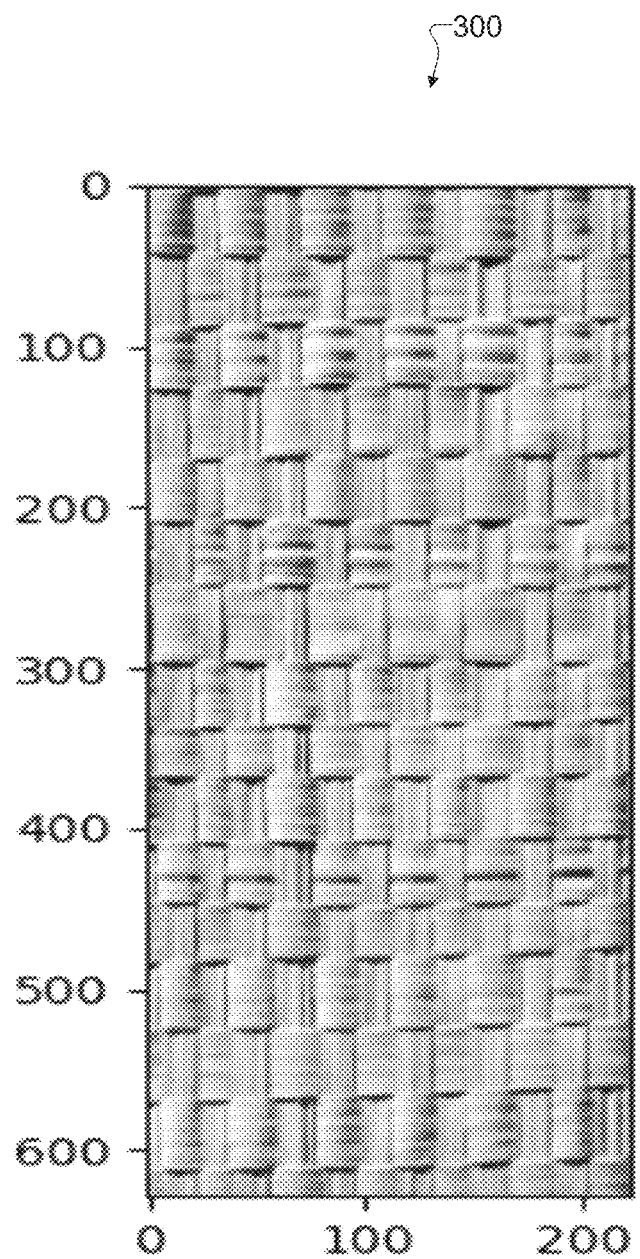
FIG. 3 illustrates an example image of a texture that is part of a texture dataset according to this disclosure.

The texture dataset 260 includes multiple images of textures that are modeled in the YUV domain. In some embodiments, the textures in the texture dataset 260 are obtained from a texture database or publication (such as "Textures: A Photographic Album for Artists and Designers" by Phil Brodatz, Dover Publications, 1966). Of course, this is merely one example, and other textures can be obtained from any suitable source. FIG. 3 illustrates an example image of a texture 300 that is part of the texture dataset 260 according to this disclosure. As shown in FIG. 3, the texture 300 includes repeated patterns that define lighter areas (greater intensity) and darker areas (lesser intensity).

Figure 4:
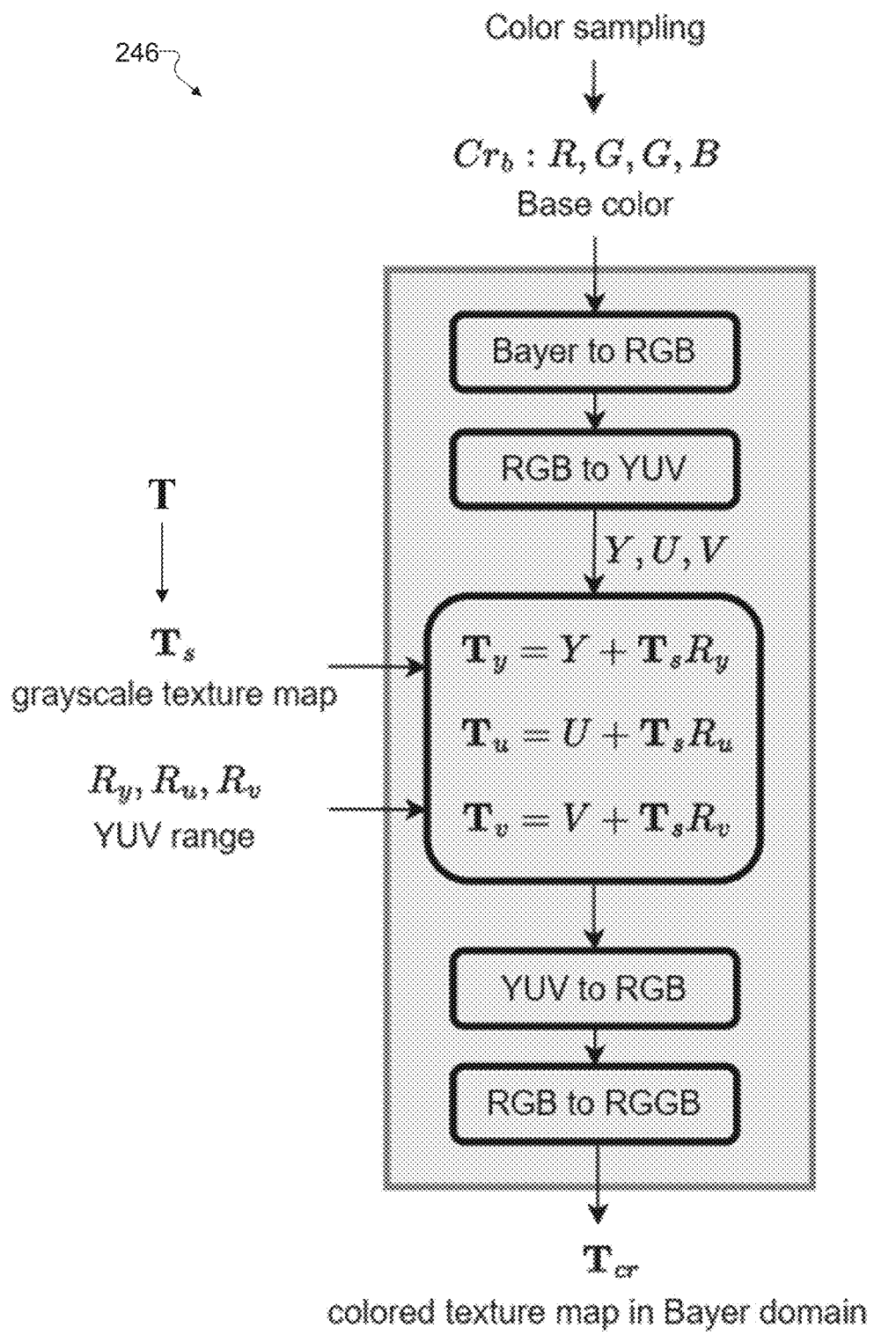
FIG. 4 illustrates further details of an example texture blending operation that can be performed in the process of FIG. 2 according to this disclosure.

FIG. 4 illustrates further details of an example texture blending operation 246 that can be performed in the process 200 of FIG. 2 according to this disclosure. As shown in FIG. 4, the server 106 selects a texture map T from the texture dataset 260. The server 106 performs pre-processing operations on the texture map T, including normalization 262 and augmentation 264, to generate a final texture map $T_s$. In normalization 262, the server 106 reduces the magnitude of each pixel in the texture map T to generate a normalized texture map $T_n$, such as in the following manner.

$T_n = T/\max(T)$.

The server 106 determines the most frequent intensity as the base color I of the texture map, and subtracts the normalized texture map $T_n$ by the base color I to get the final texture map $T_s$, such as in the following manner.

$T_s = T_n - I$.

In augmentation 264, the server performs random rotation and resizing operations on the final texture map $T_s$.

The server 106 also obtains color information from the color table 204. To sample the color information from the color table 204, the server 106 can generates a random number r between 0 and the length of the color table 204. The server 106 fetches the color at location r in the color table 204, and this color is used as the base color $Cr_b$ for the circle 240. It will be apparent that, because of the number of records for each color in the color table 204, multiple random selections from the color table 204 over time will generally reflect the distribution of colors in the raw image 201.

The server 106 also obtains range information from the YUV range table 208. To sample the range information from the YUV range table 208, the process may be similar to that of color sampling. The server 106 generates a random number r between 0 and the length of the YUV range table 208 and fetches the range information R at location r in the YUV range table 208. The range information R is used for scaling of the texture (such as defining how large the texture features are) and prominence of texture (such as defining whether the texture features are faint or bold) in the circle 240.

The server 106 performs texture blending in which the server 106 converts the base color $Cr_b$ to the YUV domain and blends the base color $Cr_b$ with information from the final texture map $T_s$, such as in the following manner.

$T_y = Y + T_s \cdot R_y$, $T_u = U + T_s \cdot R_u$, $T_v = V + T_s \cdot R_v$.

The server 106 converts the YUV texture map back to the Bayer domain, thus generating a colored texture map $T_{cr}$ in the Bayer domain. The circle 240 is generated with an appearance that matches the colored texture map $T_{cr}$.

Figure 5B:
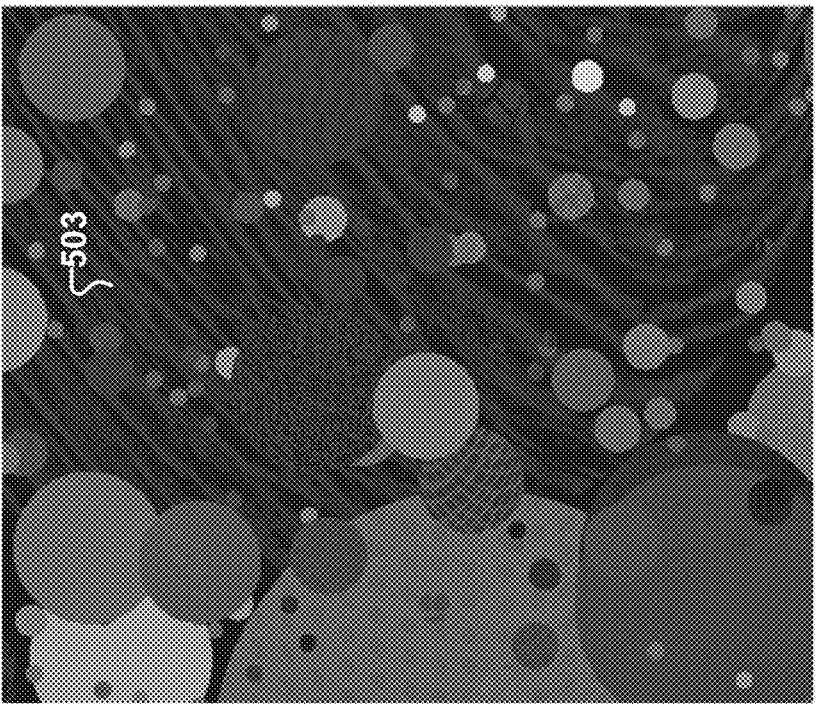
FIGS. 5A and 5B illustrate examples of blending texture information in a dead leaves image according to this disclosure.
Figure 5A:
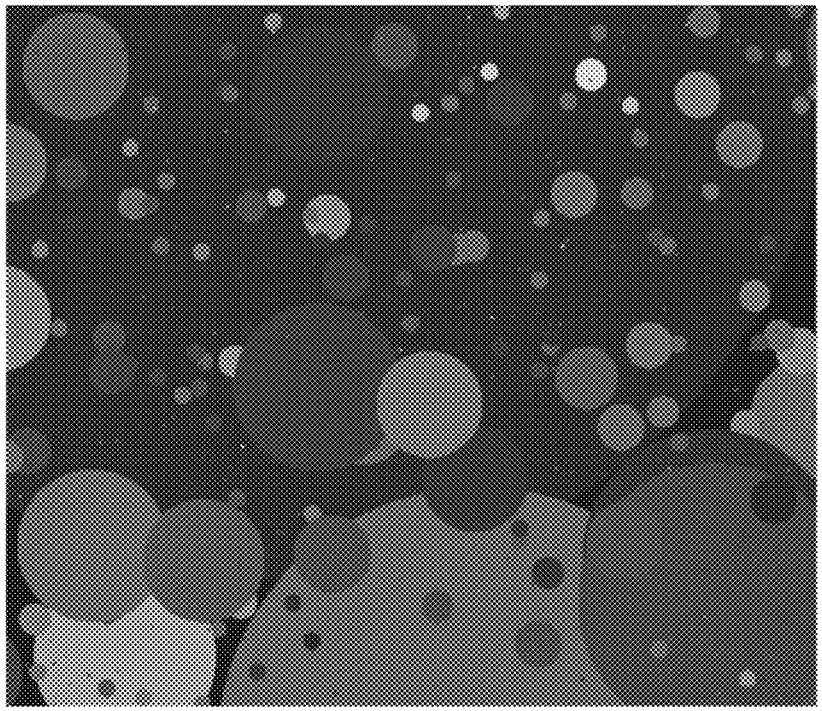

FIGS. 5A and 5B illustrate examples of blending texture information in a dead leaves image according to this disclosure. More specifically, FIG. 5A shows a conventional dead leaves image 501 that includes multiple circles of different sizes and colors. However, every circle is "flat" in appearance. That is, there is no apparent texture in any circle. In contrast, FIG. 5B shows a dead leaves image 502 that can be generated using the texture blending operation 246 described above. As shown in FIG. 5B, many of the circles in the dead leaves image 502 include texture information 503 in the form of additional lines and shapes within each circle. Such a dead leaves image 502 has the ability to model realistic texture information of natural images than the conventional dead leaves image 501.

Turning again to FIG. 2, in addition to adding one or more circles 240 to the blank image 220, the server 106 adds one or more sticks 250 to the blank image 220. As shown in the example image 501, conventional dead leaves images are composed of circular discs, which mimic the marginal statistics and bivariate statistics of natural images. However, straight lines and sharp edges, which appear frequently in real-world scenes, are missing in this example image 501.

The addition of the sticks 250 in the process 200 adds more realism to the dead leaves image 280, since real images are typically not just a group of circles. The sticks 250 also add edges to the dead leaves image 280, which are helpful in training machine learning models that use the dead leaves image 280 as training data. The result is improved modeling of long edges such as lines and rectangles in final images.

To add a stick 250 to the blank image 220, the server 106 randomly selects a coordinate in the blank image 220 for a base position 252 of the stick 250. The server 106 also selects various parameters 254 for the stick 250, including the angle of the stick 250, the width of the stick 250, and the height of the stick 250. In addition, the server 106 randomly selects color information from the color table 204 to determine the color 256 of the stick 250. Once the information is determined, the server 106 adds the stick 250 to the blank image 220.

Figure 6:
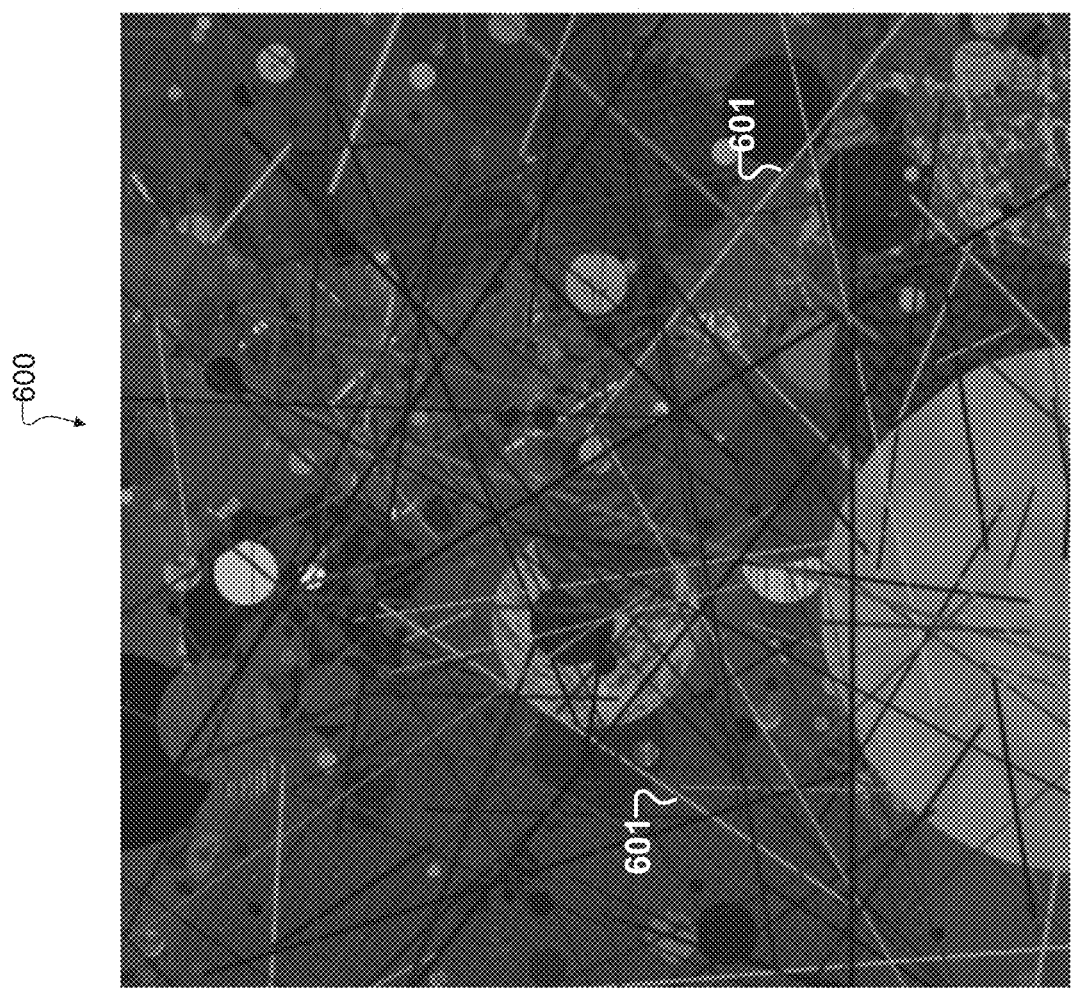
FIG. 6 illustrates an example dead leaves image having multiple sticks according to this disclosure.

FIG. 6 illustrates an example dead leaves image 600 having multiple sticks according to this disclosure. As shown in FIG. 6, the dead leaves image 600 includes multiple sticks 601, which can represent the sticks 250 added in the process 200. The sticks 601 are formed using different sizes, angles, locations, and colors. This is in contrast to the conventional dead leaves image 501, which does not include any sticks. As discussed above, the presence of the sticks 601 can help to improve proper modeling of lines and rectangles in final images.

As discussed above, the process 200 includes multiple iterations of the iterative process 230. During one or more iterations, the server 106 performs an image blurring operation 272. The image blurring operation 272 is performed to model a defocus effect in real images; for instance, in real images, due to camera aperture, some objects might not be in focus as compared to other objects. In some embodiments, the image blurring operation 272 can be performed at a specific iteration threshold (N), where N is a specified integer. Thus, if N=179, the image blurring operation 272 can be performed at iteration number 179. This will have the effect of blurring at least some of the circles 240 and sticks 250 that have been added until iteration number 179. All the circles 240 and sticks 250 added after that will not be blurred. At operation 270, the server 106 determines if the current iteration is an Nth iteration. If so, the server 106 performs the image blurring operation 272. The image blurring operation 272 can be performed because conventional dead leaves images have sharp edges and do not contain depth differences among their circles. Modeling a blurring or defocusing effect enhances the similarity between the dead leaves image 280 and real-world images. In the image blurring operation 272, the server 106 blurs one or more portions of the image being created. For example, the server 106 can blur a subset of the circles 240 and/or the sticks 250 that have already been added to the blank image 220. In some embodiments, the server 106 can use a Gaussian filter to perform the image blurring. The length of the Gaussian filter can be specified or randomly selected during each image blurring operation 272.

At operation 274, the server 106 determines if the blank image 220 is completely filled with circles 240 and sticks 250. The dead leaves image 600 is an example of a dead leaves image that is completely filled with circles and sticks. If the server 106 determines in operation 274 that there are regions of the blank image 220 that are still unfilled (such as regions that contain no circles 240 or sticks 250), the server 106 performs another iteration of the iterative process 230 to add additional circles 240 and sticks 250. If the server 106 determines in operation 274 that the blank image 220 is completely filled, the blank image 220 is considered to be a completed dead leaves image 280. The dead leaves image 280 can later be used in a downstream image processing task, such as image super-resolution tasks, computer vision tasks, machine learning model training tasks, and the like.

Although FIGS. 2 through 6 illustrate one example of a process 200 for generating synthetic dead leaves images and related details, various changes may be made to FIGS. 2 through 6. For example, while shown as a specific sequence of operations, various operations shown in FIGS. 2 through 6 could overlap, occur in parallel, occur in a different order, or occur any number of times (including zero times). Also, the specific operations shown in FIGS. 2 through 6 are examples only, and other techniques could be used to perform each of the operations shown in FIGS. 2 through 6.

Figure 7:
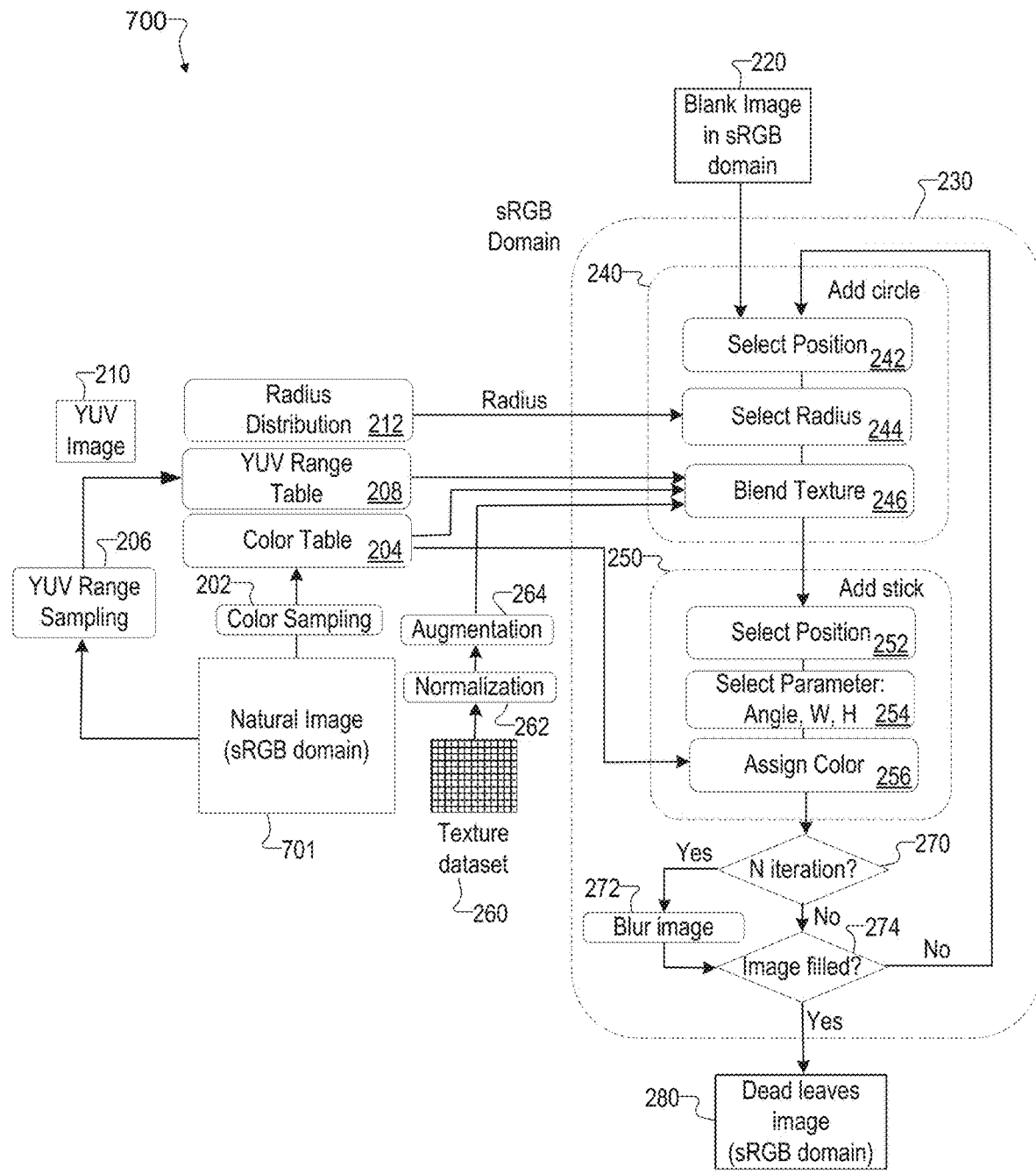
FIGS. 7 and 8 illustrate additional examples of processes for generating synthetic dead leaves images according to this disclosure.
Figure 8:
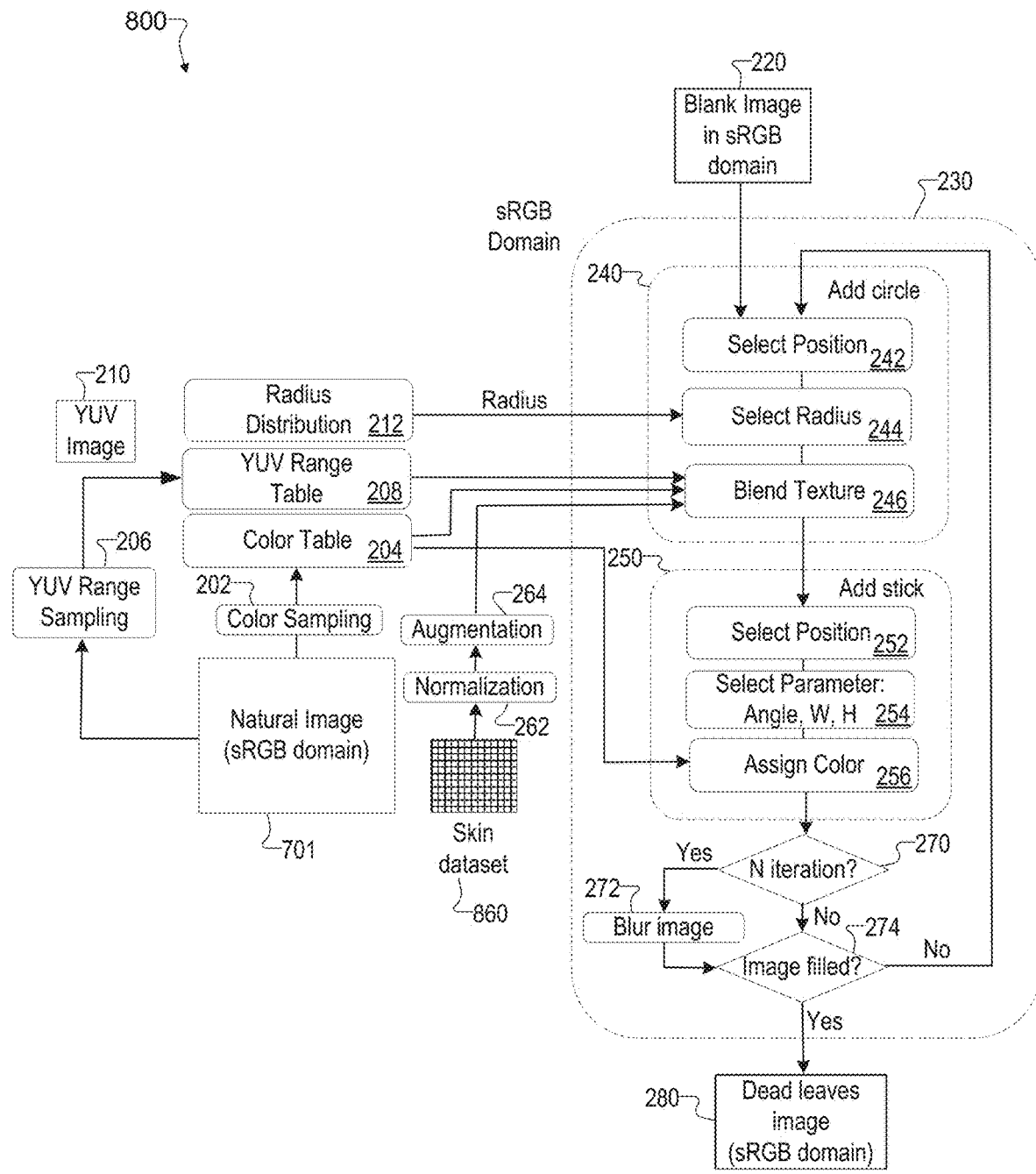

FIGS. 7 and 8 illustrate additional examples of processes 700, 800 for generating synthetic dead leaves images according to this disclosure. For ease of explanation, the processes 700, 800 are described as being implemented using one or more components of the server 106 described above. However, this is merely one example, and the processes 700, 800 could be implemented using any other suitable device(s).

As shown in FIGS. 7 and 8, the processes 700, 800 are similar to the process 200 and include many operations and components that are the same as or similar to those of the process 200. However, unlike the process 200 (which is performed in the Bayer domain), the process 700 is performed in the sRGB domain. That is, the server 106 obtains a natural image 701 and a blank image 220 in the sRGB domain. The iterative process 230 is also performed in the sRGB domain. Accordingly, the resulting dead leaves image 280 is generated in the sRGB domain. Dead leaves images in the sRGB domain can be used for certain downstream tasks, such as computer vision tasks, that require data in the sRGB domain.

As shown in FIG. 8, the process 800 is also performed in the sRGB domain. In addition, the texture dataset 260 is replaced with a skin dataset 860. The skin dataset 860 includes images that illustrate texture information of human skin, rather than textures of inanimate objects. The human skin texture information is useful for generating dead leaves images 280 used as training data for training machine learning models that reconstruct images of a human face, such as "selfies."

Although FIGS. 7 and 8 illustrate other examples of processes 700, 800 for generating synthetic dead leaves images and related details, various changes may be made to FIGS. 7 and 8. For example, while shown as a specific sequence of operations, various operations shown in FIGS. 7 and 8 could overlap, occur in parallel, occur in a different order, or occur any number of times (including zero times). Also, the specific operations shown in FIGS. 7 and 8 are examples only, and other techniques could be used to perform each of the operations shown in FIGS. 7 and 8.

Figure 9:
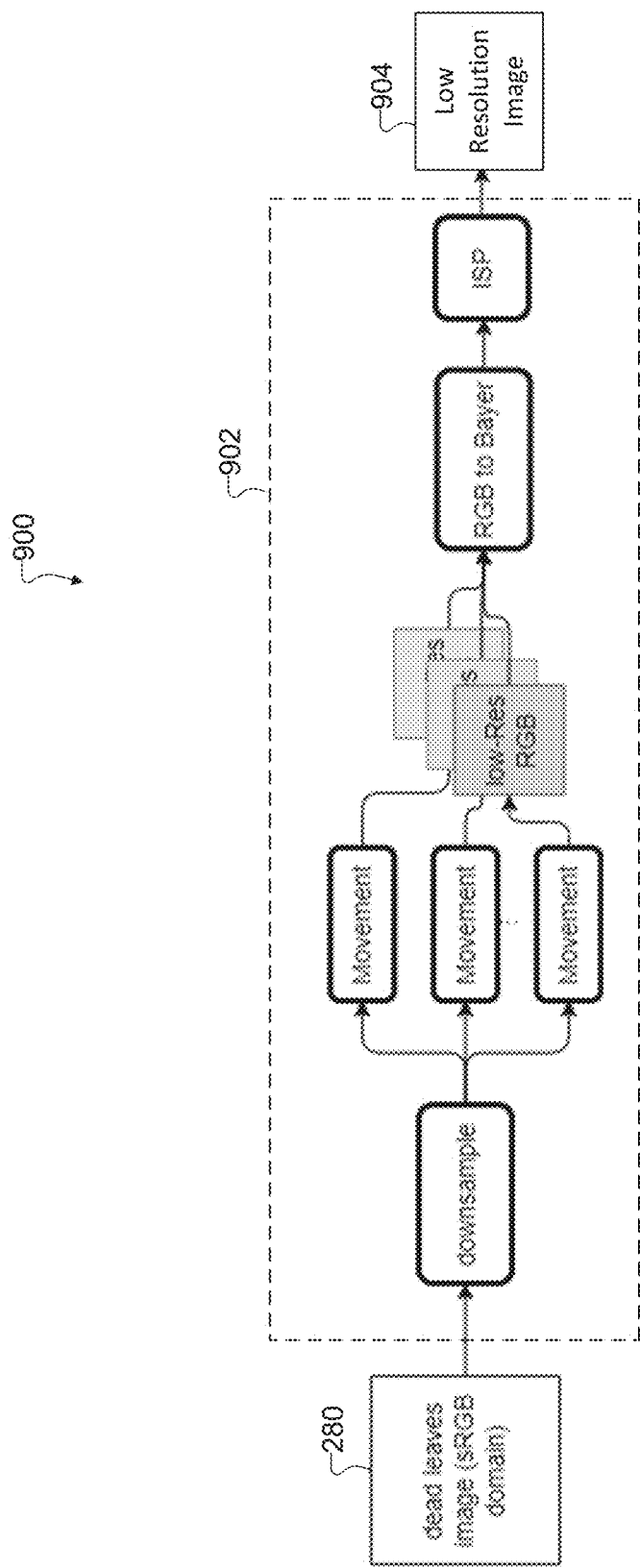
FIG. 9 illustrates an example downstream process that can be performed using dead leaves images generated according to this disclosure.

Once generated, the dead leaves images 280 can be used in various image processing techniques. For example, FIG. 9 illustrates an example downstream process 900 that can be performed using dead leaves images generated according to this disclosure. As shown in FIG. 9, the server 106 obtains one or more dead leaves images 280 that are generated using one of the processes 200, 700, 800 described above. In the example shown in FIG. 9, the dead leaves images 280 are generated in the sRGB domain. The dead leaves images 280 are provided as input to a downstream image processing technique 902. In the example shown in FIG. 9, the image processing technique 902 is a super-resolution technique that generates a low resolution image 904 from the dead leaves images 280. The image processing technique 902 can include conventional super-resolution operations or super-resolution operations that may be developed in the future. Of course, super-resolution is merely one example of a downstream image processing technique. The image processing technique 902 can represent any suitable image processing technique, including image denoising, image reconstruction for under-display-cameras, and the like.

Note that the operations and functions shown in FIGS. 2 through 9 can be implemented in an electronic device 101, server 106, or other device in any suitable manner. For example, in some embodiments, the operations and functions shown in FIGS. 2 through 9 can be implemented or supported using one or more software applications or other software instructions that are executed by the processor 120 of the electronic device 101, server 106, or other device. In other embodiments, at least some of the operations and functions shown in FIGS. 2 through 9 can be implemented or supported using dedicated hardware components. In general, the operations and functions shown in FIGS. 2 through 9 can be performed using any suitable hardware or any suitable combination of hardware and software/firmware instructions.

Figure 10:
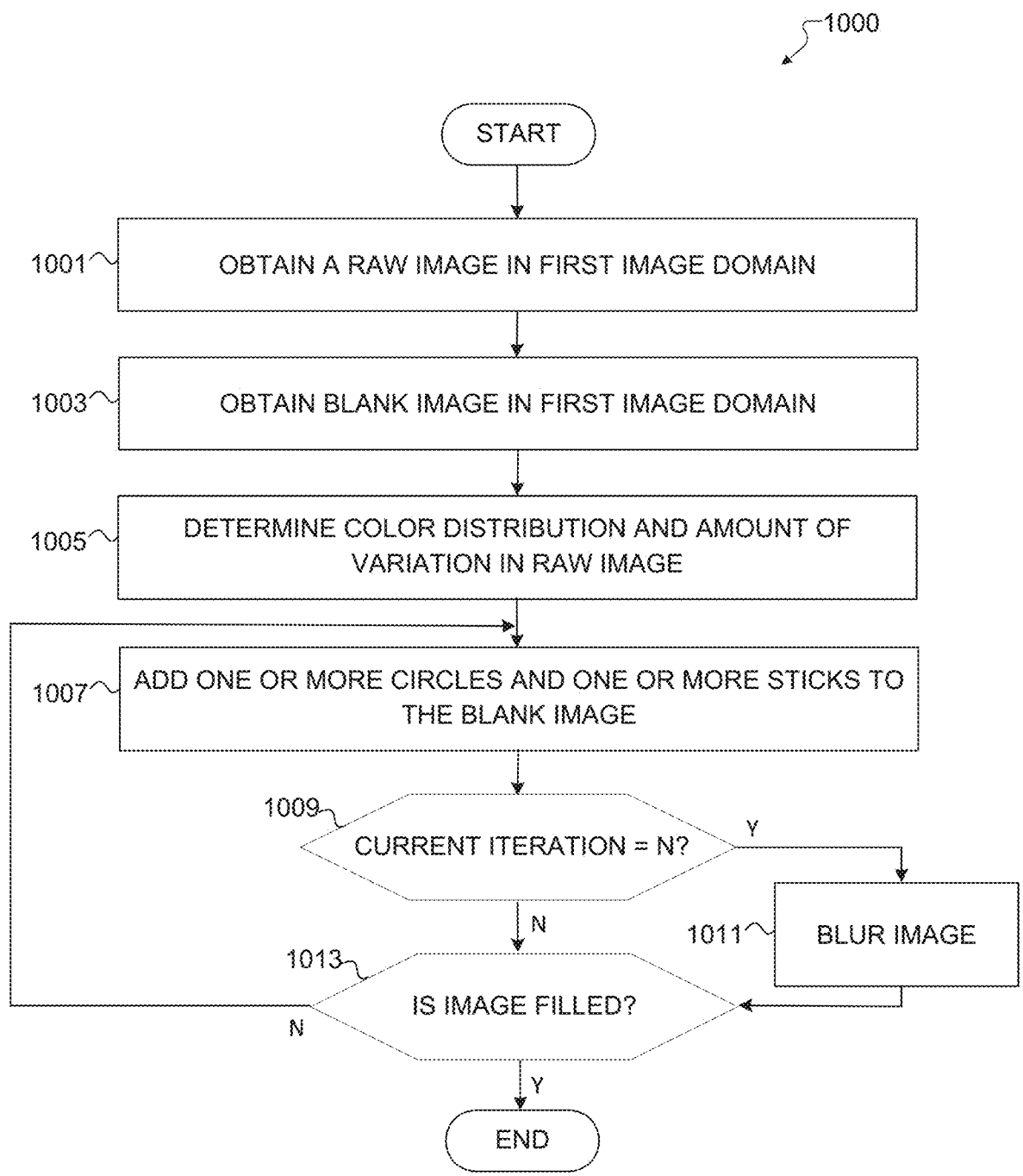
FIG. 10 illustrates an example method for generating a synthetic dead leaves image according to this disclosure.

FIG. 10 illustrates an example method 1000 for generating a synthetic dead leaves image according to this disclosure. For ease of explanation, the method 1000 shown in FIG. 10 is described as involving the use of the server 106 shown in FIG. 1 and the process 200 shown in FIG. 2. However, the method 1000 shown in FIG. 10 could be used with any other suitable electronic device and any suitable process.

As shown in FIG. 10, a raw image in a first image domain is obtained at step 1001. This could include, for example, the server 106 obtaining the raw image 201 in the Bayer domain, the sRGB domain, or any other suitable domain. A blank image in the first image domain is obtained at step 1003. This could include, for example, the server 106 obtaining the blank image 220 in the Bayer domain, the sRGB domain, or any other suitable domain. A color distribution and an amount of variation in the raw image are determined at step 1005. This could include, for example, the server 106 performing the color sampling operation 202 on the raw image 201 to generate the color table 204 and the server 106 performing the YUV range sampling operation 206 to generate the YUV range table 208.

An iterative process is performed to generate a dead leaves image from the blank image at step 1007. In each iteration of the iterative process, one or more circles and one or more sticks are added to the blank image. Textures of the circles are blended based on the color distribution and the amount of variation in the raw image. This could include, for example, the server 106 performing the iterative process 230 to add circles 240 and sticks 250 to the blank image 220. It is determined if the current iteration is the Nth iteration at step 1009, where N is a pre-specified integer. This could include, for example, the server 106 determining if the current iteration is, e.g., iteration number 179 (assuming N=179). If it is determined that the current iteration is the Nth iteration, the method 1000 continues to step 1011. If it is determined that the current iteration is not the Nth iteration, the method 1000 continues to step 1013.

Portions of the dead leaves image are blurred at step 1011. This could include, for example, the server 106 performing the image blurring operation 272 to blur one or more circles 240 and/or sticks 250 in the blank image 220. It is determined if the blank image is filled at step 1013. This could include, for example, the server 106 determining if there are regions in the blank image 220 that contain no circles 240 or sticks 250. If it is determined that the blank image is filled, the dead leaves image 280 is generated, and the method 1000 ends. If it is determined that the blank image is not filled, the method 1000 returns to step 1007 for additional iterations.

Although FIG. 10 illustrates one example of a method 1000 for generating a synthetic dead leaves image, various changes may be made to FIG. 10. For example, while shown as a series of steps, various steps in FIG. 10 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining a raw image in a first image domain;
   determining a color distribution and an amount of variation in the raw image; and
   using an iterative process to generate a dead leaf image from a blank image in the first image domain, the iterative process comprising:
      adding multiple circles and multiple sticks to the blank image until the dead leaf image is filled; and
      blurring portions of the dead leaf image during at least one iteration of the iterative process;
   wherein textures of the multiple circles are blended based on the color distribution and the amount of variation in the raw image.

2. The method of claim 1, wherein colors of the multiple sticks are assigned based on the color distribution in the raw image.

3. The method of claim 1, wherein determining the color distribution in the raw image comprises:
   filtering noise in the raw image to create a filtered raw image;
   determining a color histogram of the filtered raw image; and
   generating a color table based on the color histogram.

4. The method of claim 3, wherein determining the amount of variation in the raw image comprises:
   converting the raw image from the first image domain to a second image domain;
   dividing the raw image in the second image domain into multiple patches;
   determining a range of each channel for each of the multiple patches;
   determining a histogram of the raw image using the determined ranges; and
   generating a range table based on the histogram.

5. The method of claim 4, further comprising:
   sampling color information from the color table to determine the color distribution in the raw image;
   sampling range information from the range table to determine the amount of variation in the raw image; and
   blending the textures of the multiple circles using the color distribution and the amount of variation in the raw image.

6. The method of claim 1, wherein the textures of the multiple circles are further blended based on one or more texture maps obtained from a texture dataset.

7. The method of claim 1, wherein blurring the portions of the dead leaf image during the at least one iteration of the iterative process comprises:

during an $N^{th}$ iteration, blurring at least one portion of the dead leaf image using a Gaussian filter, wherein N is a specified integer.

8. An electronic device comprising:

at least one processing device configured to:
obtain a raw image in a first image domain;
determine a color distribution and an amount of variation in the raw image; and
use an iterative process to generate a dead leaf image from a blank image in the first image domain;
wherein, in the iterative process, the at least one processing device is configured to:
add multiple circles and multiple sticks to the blank image until the dead leaf image is filled; and
blur portions of the dead leaf image during at least one iteration of the iterative process; and
wherein the at least one processing device is configured to blend textures of the multiple circles based on the color distribution and the amount of variation in the raw image.

9. The electronic device of claim 8, wherein the at least one processing device is configured to assign colors of the multiple sticks based on the color distribution in the raw image.

10. The electronic device of claim 8, wherein, to determine the color distribution in the raw image, the at least one processing device is configured to:

filter noise in the raw image to create a filtered raw image;
determine a color histogram of the filtered raw image; and
generate a color table based on the color histogram.

11. The electronic device of claim 10, wherein, to determine the amount of variation in the raw image, the at least one processing device is configured to:

convert the raw image from the first image domain to a second image domain;
divide the raw image in the second image domain into multiple patches;
determine a range of each channel for each of the multiple patches;
determine a histogram of the raw image using the determined ranges; and
generate a range table based on the histogram.

12. The electronic device of claim 11, wherein the at least one processing device is further configured to:

sample color information from the color table to determine the color distribution in the raw image;
sample range information from the range table to determine the amount of variation in the raw image; and
blend the textures of the multiple circles using the color distribution and the amount of variation in the raw image.

13. The electronic device of claim 8, wherein the at least one processing device is configured to blend the textures of the multiple circles based on one or more texture maps obtained from a texture dataset.

14. The electronic device of claim 8, wherein, to blur the portions of the dead leaf image during the at least one iteration of the iterative process, the at least one processing device is configured to:

during an $N^{th}$ iteration, blur at least one portion of the dead leaf image using a Gaussian filter, wherein N is a specified integer.

15. A non-transitory machine-readable medium containing instructions that when executed cause at least one processor of an electronic device to:

obtain a raw image in a first image domain;
determine a color distribution and an amount of variation in the raw image; and
use an iterative process to generate a dead leaf image from a blank image in the first image domain;
wherein, during the iterative process, the instructions when executed cause the at least one processor to:
add multiple circles and multiple sticks to the blank image until the dead leaf image is filled; and
blur portions of the dead leaf image during at least one iteration of the iterative process; and
wherein the instructions when executed cause the at least one processor to blend textures of the multiple circles based on the color distribution and the amount of variation in the raw image.

16. The non-transitory machine-readable medium of claim 15, wherein the instructions when executed cause the at least one processor to assign colors of the multiple sticks based on the color distribution in the raw image.

17. The non-transitory machine-readable medium of claim 15, wherein the instructions that when executed cause the at least one processor to determine the color distribution in the raw image comprise instructions that when executed cause the at least one processor to:

filter noise in the raw image to create a filtered raw image;
determine a color histogram of the filtered raw image; and
generate a color table based on the color histogram.

18. The non-transitory machine-readable medium of claim 17, wherein the instructions that when executed cause the at least one processor to determine the amount of variation in the raw image comprise instructions that when executed cause the at least one processor to:

convert the raw image from the first image domain to a second image domain;
divide the raw image in the second image domain into multiple patches;
determine a range of each channel for each of the multiple patches;
determine a histogram of the raw image using the determined ranges; and
generate a range table based on the histogram.

19. The non-transitory machine-readable medium of claim 18, further containing instructions that when executed cause the at least one processor to:

sample color information from the color table to determine the color distribution in the raw image;
sample range information from the range table to determine the amount of variation in the raw image; and
blend the textures of the multiple circles using the color distribution and the amount of variation in the raw image.

20. The non-transitory machine-readable medium of claim 15, wherein the instructions when executed cause the at least one processor to blend the textures of the multiple circles based on one or more texture maps obtained from a texture dataset.

* * * * *